(12) United States Patent
McCoy et al.

(10) Patent No.: US 8,807,498 B1
(45) Date of Patent: Aug. 19, 2014

(54) SAWHORSE BRACKET

(76) Inventors: Harold A. McCoy, Las Vegas, NV (US); James A. McCoy, Las Vegas, NV (US)

( * ) Notice: Subject to any disclaimer, the term of this patent is extended or adjusted under 35 U.S.C. 154(b) by 0 days.

(21) Appl. No.: 12/792,603

(22) Filed: Jun. 2, 2010

Related U.S. Application Data

(60) Provisional application No. 61/183,505, filed on Jun. 2, 2009.

(51) Int. Cl.
*F16M 11/00* (2006.01)
*F16B 1/00* (2006.01)
*B25B 1/02* (2006.01)

(52) U.S. Cl.
USPC .................. 248/201; 248/228.1; 269/139

(58) Field of Classification Search
USPC .............. 248/200, 205.1, 214, 226.11, 227.4, 248/228.1, 231.85, 201; 269/139, 136
See application file for complete search history.

(56) References Cited

U.S. PATENT DOCUMENTS

| | | | | |
|---|---|---|---|---|
| 1,352,188 A | * | 9/1920 | Giles | 182/186.3 |
| 1,656,558 A | * | 1/1928 | Dysinger | 182/155 |
| 2,136,420 A | * | 11/1938 | Edwards | 182/226 |
| 2,506,389 A | * | 5/1950 | Samuelson | 182/224 |
| 3,349,869 A | | 10/1967 | Evans | |
| 3,530,956 A | * | 9/1970 | Jadek | 182/186.2 |
| 3,656,581 A | | 4/1972 | Larson | |
| 4,127,260 A | * | 11/1978 | Hickman | 269/139 |
| 4,134,473 A | * | 1/1979 | Prior | 182/92 |
| 4,238,001 A | | 12/1980 | Alexander | |
| 4,461,370 A | * | 7/1984 | Connell | 182/153 |
| 4,508,194 A | | 4/1985 | Freewalt et al. | |
| D280,440 S | * | 9/1985 | Gromer, Jr. | D25/67 |
| 4,770,274 A | * | 9/1988 | Middleton | 182/186.3 |
| 4,836,333 A | | 6/1989 | Twigger | 182/181.1 |
| 4,877,109 A | * | 10/1989 | Welch et al. | 182/182.4 |
| 5,779,003 A | | 7/1998 | Carty | 182/225 |
| 5,913,381 A | * | 6/1999 | D'Armond, Jr. | 182/186.3 |
| 6,155,318 A | * | 12/2000 | Underwood | 144/286.1 |
| 6,564,903 B2 | | 5/2003 | Krajec | |
| 6,612,401 B1 | * | 9/2003 | Price et al. | 182/186.3 |
| 6,758,307 B1 | * | 7/2004 | Ols | 182/186.3 |

* cited by examiner

*Primary Examiner* — Joshua J Michener
*Assistant Examiner* — Chiedu Chibogu
(74) *Attorney, Agent, or Firm* — John C. Lambertsen; Kenehan & Lambertsen, Ltd.

(57) ABSTRACT

A sawhorse bracket permits assembly of a heavy duty sawhorse from support lumber pieces that may be easily disassembled for transport and storage. The sawhorse bracket includes a cross beam bracket and two attached and opposing support leg brackets—all of channel-shaped body construction. Both the cross beam bracket and the pair of support leg brackets have retention members that may be utilized to selectively retain support lumber within the respective brackets. A web brace extends between the opposed leg brackets to provide additional lateral support and resist the spreading of the support legs when a load is being carried by the assembled sawhorse.

12 Claims, 3 Drawing Sheets

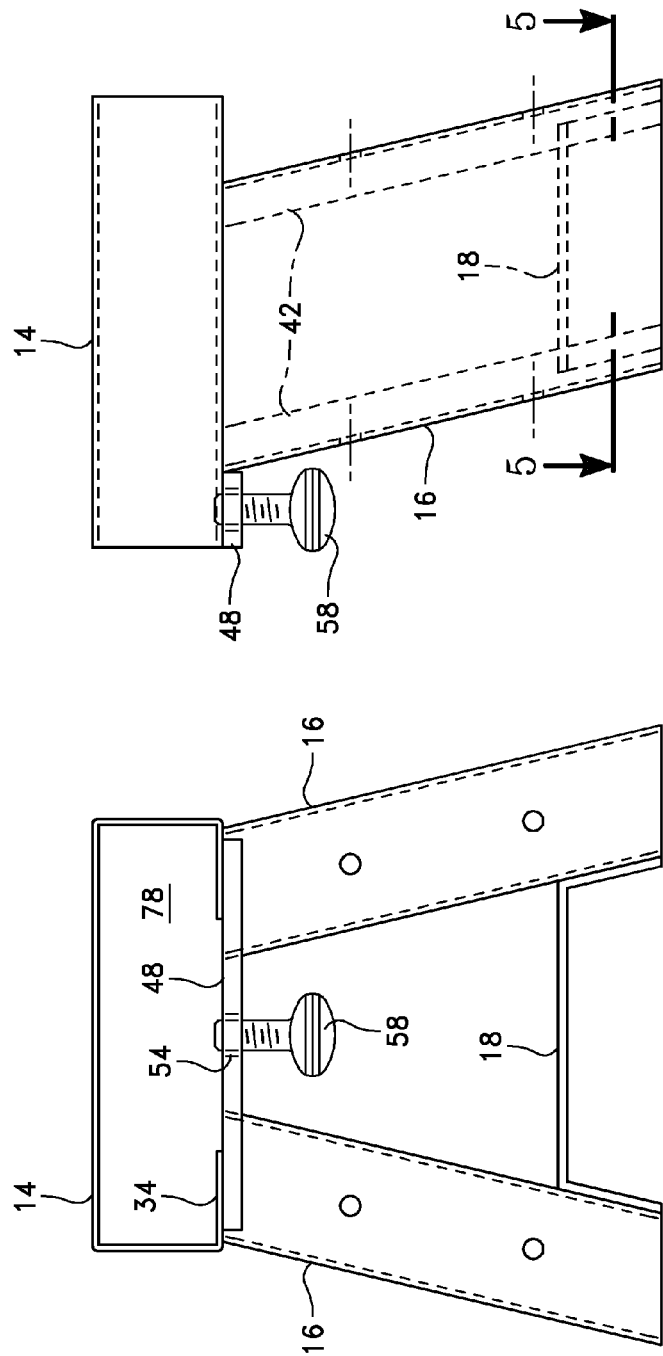
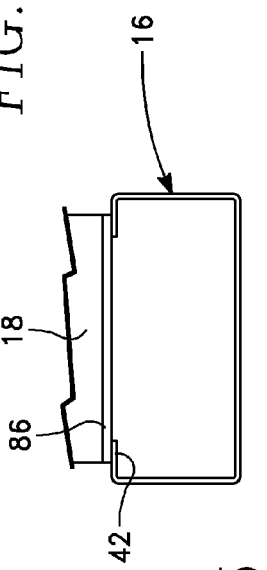
FIG. 3
FIG. 4
FIG. 5

US 8,807,498 B1

SAWHORSE BRACKET

RELATED APPLICATIONS

The present application claims priority under 35 U.S.C. §119(e) to U.S. Provisional Patent Application Ser. No. 61/183,505, filed Jun. 2, 2009, which is incorporated by reference herein.

BACKGROUND OF THE INVENTION

1. Field of the Invention

The present invention relates to support structures, and more particularly, to sawhorses, trestles, and related structures. More specifically, the present invention relates to brackets of the type adapted to receive lengths of wood as legs and to carry a cross beam, with a pair of brackets used to construct a sawhorse.

2. Description of the Related Art

Sawhorses have long been used in the construction trade, providing a beam with four legs used to support construction materials for sawing. A pair of sawhorses can support a plank, providing an easily made scaffold. Two sawhorses can also be used to easily form a work surface, through placement of a sheet of plywood or door on top thereof.

While sawhorses can be easily constructed in the field, attaching pairs of 2×4's to form the legs, and then attaching a cross beam between the two sets of legs. However, the structural integrity of the sawhorse thus formed is directly related to the skill with which the various members are attached together. Increased confidence is frequently obtained through the use of pre-formed sawhorse brackets that are used at either end of the cross beam; receiving both legs and the cross beam to assure a solid connection. Some of these brackets are provided with pivoting legs, permitting the sawhorses to be collapsed when in storage or transit.

Previous sawhorse brackets do not lend themselves to easy assembly and rapid tear down—yet when fully assembled, provide a strong sawhorse capable of supporting heavy loads with strength and stability. A need exists for saw horse assemblies that can be rapidly broken down into separate parts—ideally two leg supports and a cross beam, yet when assembled offers offset legs for superior stability, permitting use of common 2×4 and 2×6 lumber, and that are easily assembled when needed and disassembled for storage and transport.

DISCLOSURE OF THE INVENTION

A sawhorse bracket in accordance with aspects of embodiments of the present invention includes three brackets having channel-shaped bodies to receive support lumber when assembling a sawhorse. A cross beam bracket receives the support lumber forming the sawhorse cross beam, and two, opposed support leg brackets are attached to the cross beam bracket and receive the support lumber support legs. A thumb screw within the cross beam bracket is used to selectively retain the cross beam positioned within the cross beam bracket. A plurality of screw fasteners are used to retain the support legs within the support leg brackets. A web brace extends between the two opposed leg brackets to provide additional lateral support and resist the spreading of the support legs when a load is applied to the assembled sawhorse.

In a further aspect of the present invention a sawhorse bracket forming a sawhorse having a plurality of legs and a cross beam, said sawhorse bracket comprising: a cross beam bracket having a substantially channel-shaped body to receive the cross beam; and a pair of opposed support leg brackets, each attached to said cross beam bracket and each having a substantially channel-shaped body to receive a support leg.

In a still further aspect of the present invention a sawhorse bracket forming a sawhorse having a plurality of legs and a cross beam, said bracket comprising: a pair of identically-shaped support leg bracket members fixedly coupled together in a substantially v-shaped configuration, each bracket member having a substantially channel-shaped body with a pair of parallel legs and an interconnecting outer plate extending between said pair of parallel legs in a substantially planar manner; and a cross beam bracket attached in superposed configuration to said pair of support leg bracket members, said cross beam bracket having a substantially channel-shaped body with a pair of parallel legs and an interconnecting outer plate extending between said pair of parallel legs in a substantially planar manner.

It is to be understood that the invention is not limited in its application to the details of construction and the arrangement of components described hereinafter and illustrated in the drawing figures. Those skilled in the art will recognize that various modifications can be made without departing from the scope of the invention.

BRIEF DESCRIPTION OF THE DRAWINGS

Embodiments in accordance with the present invention are described below in connection with the accompanying figures.

FIG. 3 is an end elevation view of a sawhorse bracket in accordance with the present invention.

FIG. 4 is a lateral elevation view of a sawhorse in accordance with the present invention.

FIG. 5 is a cross-sectional view taken along line 5-5 of FIG. 4 showing a terminus of a leg bracket with a reinforcement spreader in accordance with the present invention.

DETAILED DESCRIPTION OF THE PREFERRED EMBODIMENTS

Figure 1:
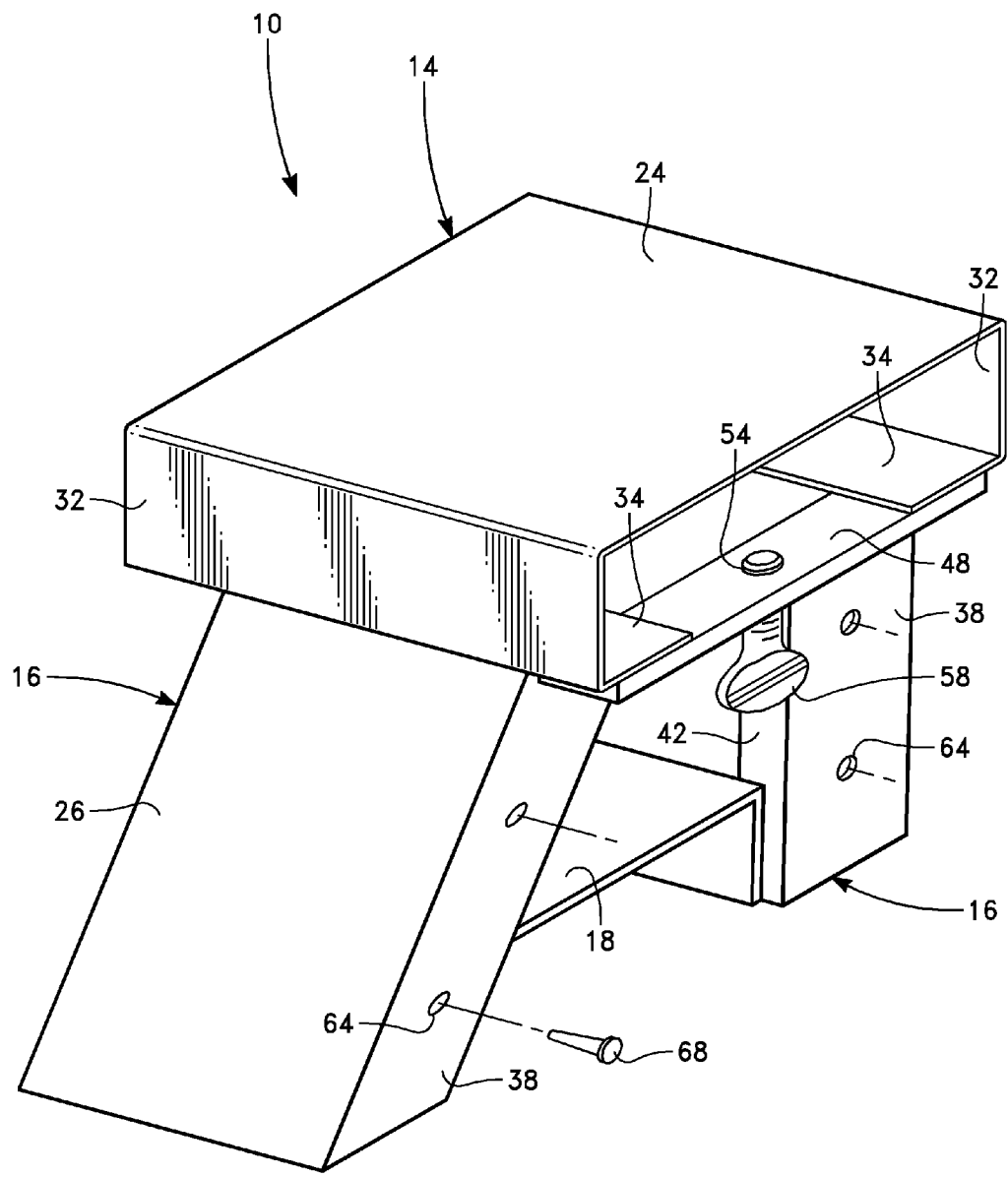
FIG. 1 is a perspective view of a sawhorse bracket in accordance with the present invention.

Reference is now made to the drawings wherein like numerals refer to like parts throughout. In FIG. 1, a sawhorse bracket 10 includes a cross beam bracket 14 and a pair of support leg brackets 16 attached to and extending from the cross beam bracket 14—preferably at a 15-degree angle relative thereto. A web brace 18 is attached to and extends between lower portions of each of the support leg brackets 14. When under load, the web brace 18 is resistive to any tendency towards the outward spreading of the leg brackets 14.

Each of the brackets is of substantially channel-shaped configuration, having a substantially planar, interconnecting plate and a pair of parallel legs. In the case of the cross beam bracket 14, the beam interconnecting plate 24 also functions as a load receiving surface. The support leg interconnecting plates 26 assist in evenly distributing the load over the terminus of the support lumber (not shown in FIG. 1).

The parallel legs, together with retention flanges extending from lateral edges of the parallel legs, restrain the support lumber within the respective brackets. The cross beam legs 32 and cross beam retention flanges 34 restrain lateral and vertical movement of the cross beam support lumber, and the parallel legs 38 of the support leg bracket 16 and the leg bracket retention flanges 42 restrain movement and secure the positioning of the leg support lumber.

Additional restraint and security with respect to the support lumber is provided for both the cross beam bracket and for each of the support leg brackets 16. A retention plate 48 is attached to and extends between opposed cross beam retention flanges 34 at a terminus opening of the cross beam bracket 14. A retention aperture 54 is formed in the retention plate and is sized to receive a retention member 58, such as a thumb screw as is depicted in FIG. 1. Each of the parallel legs 38 of the support leg bracket 16 are provided with a plurality of fastener apertures 64, which receive fasteners 68, such as wood screws, to restrain the support lumber within the support leg bracket 16.

Figure 2:
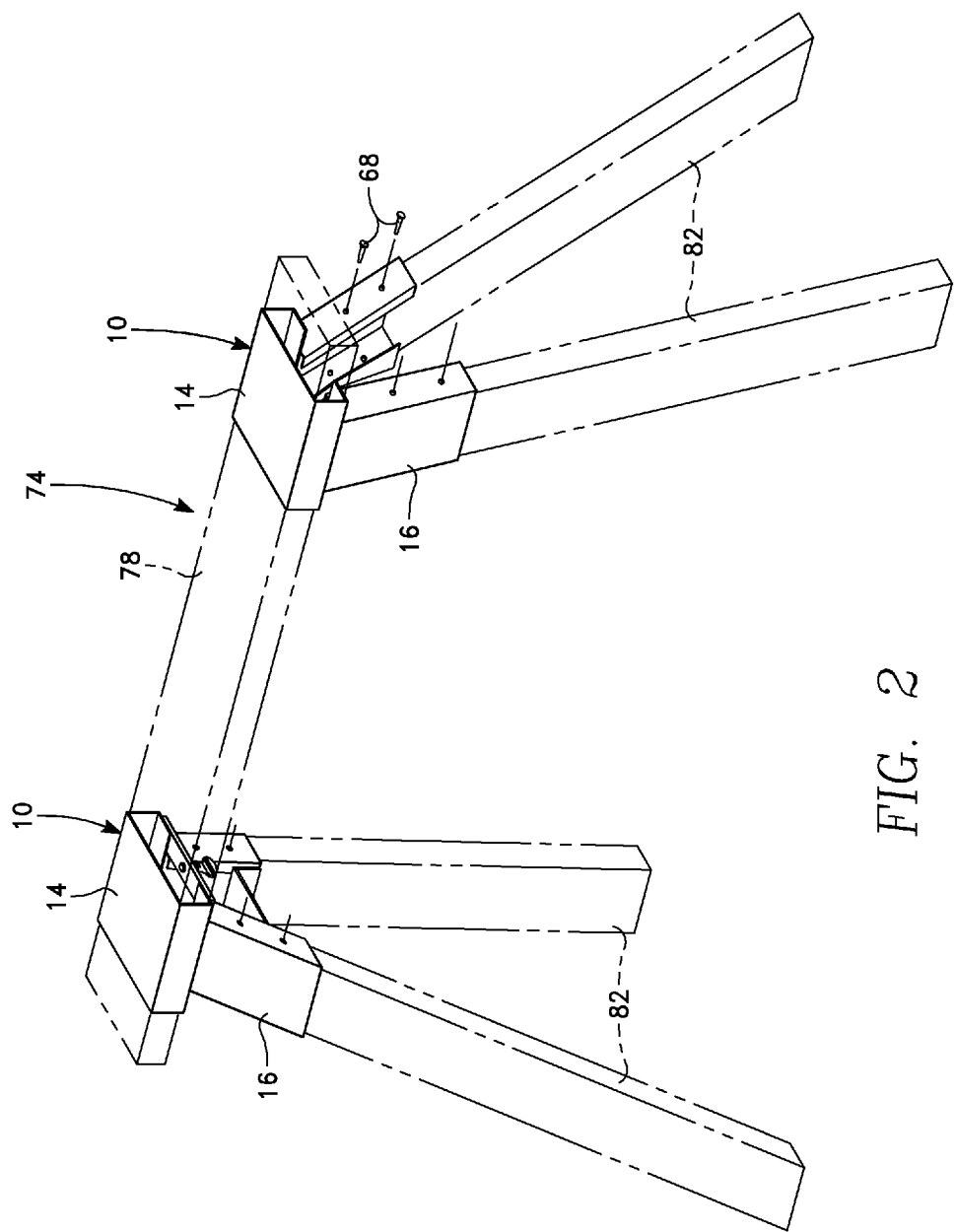
FIG. 2 is a perspective view, with portions in phantom, showing a pair of sawhorse brackets cooperatively forming a sawhorse in accordance with the present invention.

In FIG. 2 a sawhorse 74 is shown as constructed from a pair of the sawhorse brackets 10 and a plurality of support lumber. A cross beam 78 (shown in phantom) is received by and extends between the pair of cross beam brackets 14. Each of the support leg brackets 16 is provided a pair of support legs 82, typically 2×4 lumber—all being of similar length.

The fasteners 68 are preferably utilized to secure each of the support legs 82 to the support leg bracket 16 within which it is received. The cross beam 78 is likewise preferably secured within the cross beam bracket 14, as is best shown by FIG. 3. Once the cross beam 78 is received within the cross beam bracket 14 the retention member 58 is advanced within the retention aperture 54.

At some inward projecting distance the retention member 58 makes contact with the cross beam 78, and its further advancement applies an increasing force against the cross beam 78. This increasing force is applied perpendicularly to the axis used to insert and remove the cross beam from the cross beam bracket 14, and thus effectively secures the cross beam 78 within the cross beam bracket 14. Use of the retention member 58 considerably eases assembly of the sawhorse 74, and when break down is desired, the initial disassembly into the cross beam 78 and the two pairs of support legs still within their respective support leg brackets 16 requires only the loosening of the retention members 58 and withdrawal of the cross beam 78 from within the cross beam bracket 14.

In FIGS. 4 and 5 the web brace 18 is shown attached to the support leg bracket 18 adjacent a lower terminus thereof. The web brace 18 is configured as a substantially planar member terminating at each end in an attachment flange 86. The opposing, inner leg bracket retention flanges receive and are attached to the attachment flange 86, thereby acting as a restraint to the force that might otherwise cause the support legs 82 to spread apart when carrying a heavy load.

The sawhorse bracket of the present invention is preferably fabricated out of 14-gauge, hot-rolled steel that is sheared and formed to accommodate dimensional lumber as well as to achieve the dimensions hereinafter discussed. The cross beam bracket 14 includes a beam interconnecting plate of 5⅞ inches square, with cross beam legs of 1⅞ inches and retention flanges of approximately 1¼ inches. The over-all height of the sawhorse bracket is 7¼ inches.

The support leg bracket 16 channels are cut on a 15-degree angle cut and then welded to the bottom side of the retention flanges. The leg interconnecting plate measures 3¾ inches by 6 inches and the parallel legs 38 are 1⅝ inches in width. The leg bracket retention flanges extend inward ½ inch. The web brace 18 extends 4 inches, between the leg brackets, and a 1½-inch long flange, bent at a 15-degree angle is welded to each of the leg brackets, securing the web brace to each.

Selective securement of the dimensional lumber is obtained with respect to the cross beam bracket using the retention plate 48, which measures 1 inch wide and 5¼ inches long and a centrally-located ⅜-inch threaded aperture that receives a ⅜ inch thumb screw. The dimensional lumber is secured to each of the leg brackets using a plurality of fastener apertures of ¼ inch, which receive wood screws that are installed upon insertion of the dimensional wood into the leg bracket.

Our invention has been disclosed in terms of a preferred embodiment thereof, which provides a sawhorse bracket that is of great novelty and utility. Various changes, modifications, and alterations in the teachings of the present invention may be contemplated by those skilled in the art without departing from the intended spirit and scope thereof. It is intended that the present invention encompass such changes and modifications.

We claim:

1. A sawhorse bracket for a sawhorse of the type having a plurality of legs and a cross beam, said sawhorse bracket comprising:
   a cross beam bracket having a substantially channel-shaped body dimensioned to slidably receive the cross beam within said channel-shaped body, wherein said channel-shaped body of said cross beam bracket comprises an open channel having a continuous outer surface and a pair of lateral legs, each of said lateral legs terminating in an inwardly-extending flange; and
   a pair of opposed support leg brackets, each attached to said cross beam bracket and each having a substantially channel-shaped body to receive a support leg, wherein said channel-shaped body of said support leg brackets comprises an open channel having a continuous outer surface and a pair of lateral legs, each of said lateral legs terminating in an inwardly-extending flange and wherein each of said support leg brackets is directly attached to a separate one of said inwardly-extending flanges of said cross beam bracket; and
   a web brace attached to each of the opposed support leg brackets and extending therebetween, said web brace providing additional lateral support and resisting an outward spreading of said support legs upon application of a load to an assembled sawhorse.

2. The sawhorse bracket as described in claim 1, and further comprising a retention member received by said cross beam bracket and selectively extendable within said channel-shaped body for selective engagement with the cross beam when said cross beam is received therein.

3. The sawhorse bracket as described in claim 2, wherein each of said support leg brackets includes a plurality of fastener apertures formed therein, and further comprising a plurality of fasteners adapted to be received by said fastener apertures and to selectively extend within said channel-shaped body for selective engagement with the support leg when said support leg is received therein.

4. The sawhorse bracket as described in claim 2, and further comprising a retention plate attached to and extending between each of said inwardly-extending flanges of said cross beam bracket, said retention plate having a retention aperture formed therein, wherein said retention member is received by said retention aperture.

5. The sawhorse bracket as described in claim 4, wherein said retention member comprises a thumb screw.

6. The sawhorse bracket as described in claim 1, wherein said support leg brackets attach to said cross beam bracket at an angle thereto.

7. The sawhorse bracket as described in claim 6, wherein said angle is 15 degrees.

8. A sawhorse bracket comprising:

a pair of identically-shaped support leg bracket members fixedly coupled together in a substantially v-shaped configuration, each bracket member having a substantially channel-shaped body with a pair of parallel legs and an interconnecting outer plate extending between said pair of parallel legs in a substantially planar manner, wherein said pair of parallel legs on said leg bracket member each terminate in an inwardly-extending flange, defining an open channel-shaped body dimensioned to slidably receive a support leg;

a cross beam bracket attached in superposed configuration to said pair of support leg bracket members, said cross beam bracket having a substantially channel-shaped body with a pair of parallel legs and an interconnecting outer plate extending between said pair of parallel legs in a substantially planar manner, said channel-shaped body dimensioned to slidably receive a cross-beam when in use to form a sawhorse bracket, and wherein said pair of parallel legs on said cross beam bracket each terminate in an inwardly-extending flange, defining an open channel-shaped body, and wherein said pair of identically-shaped support leg bracket members are directly attached to opposed, inwardly-extending flanges of said cross beam bracket; and a web brace attached to inwardly extending flanges of each of said support brackets and extending between said leg support brackets, said web brace providing additional lateral support and resisting an outward spreading of said support legs upon application of a load to an assembled sawhorse.

9. The sawhorse bracket as described in claim 8, and further comprising a retention member received by said cross beam bracket and selectively extendable within said channel-shaped body for selective engagement with the cross beam when said cross beam is received therein.

10. A sawhorse bracket comprising:

three C-channel brackets, each having a base plate, a pair of lateral legs, and a pair of inwardly-directed flanges at the terminus of said pair of lateral legs, a first of the three C-channel brackets defining a cross beam bracket for receiving a length of lumber to form a sawhorse cross beam, and a second and a third of the three C-channel brackets defining a pair of support leg brackets, each for receiving a length of lumber to form a sawhorse leg, each of said pair of support leg brackets directly attached to a separate one of said pair of inwardly directed flanges of said cross beam bracket; and a web brace attached to and extending between each of said pair of support leg brackets, said web brace resistive to an outward spreading of said pair of support leg brackets upon application of a load to said sawhorse bracket.

11. The sawhorse bracket as described in claim 10, wherein said pair of support leg brackets attach to said cross beam bracket at an angle thereto.

12. The sawhorse bracket as described in claim 11, wherein said angle is 15 degrees.

\* \* \* \* \*